United States Patent
Shen et al.

(10) Patent No.: US 11,526,278 B2
(45) Date of Patent: Dec. 13, 2022

(54) ADAPTIVE PAGE CLOSE PREDICTION

(71) Applicant: Advanced Micro Devices, Inc., Sunnyvale, CA (US)

(72) Inventors: Guanhao Shen, Austin, TX (US); Ravindra N. Bhargava, Austin, TX (US); James Raymond Magro, Austin, TX (US); Kedarnath Balakrishnan, Whitefield (IN); Kevin M. Brandl, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/851,414

(22) Filed: Dec. 21, 2017

(65) Prior Publication Data
US 2019/0196720 A1    Jun. 27, 2019

(51) Int. Cl.
*G06F 3/06* (2006.01)

(52) U.S. Cl.
CPC .......... *G06F 3/0611* (2013.01); *G06F 3/0653* (2013.01); *G06F 3/0658* (2013.01); *G06F 3/0673* (2013.01)

(58) Field of Classification Search
CPC .... G06F 3/0611; G06F 3/0653; G06F 3/0658; G06F 3/0673; G06F 12/00; G06F 12/02; G06F 12/08; G06F 12/12; G06F 12/121
See application file for complete search history.

(56) References Cited

U.S. PATENT DOCUMENTS

| | | | |
|---|---|---|---|
| 6,282,614 B1 | 8/2001 | Musoll | |
| 6,401,180 B1 * | 6/2002 | Hartmann | G06F 12/0215 365/201 |
| 6,976,122 B1 * | 12/2005 | Sander | G06F 12/0215 711/105 |
| 7,669,011 B2 | 2/2010 | Conway | |
| 8,499,066 B1 | 7/2013 | Zhang et al. | |

(Continued)

OTHER PUBLICATIONS

GeeksForGeeks is an article taken from www.geeksforgeeks.org available online at https://www.geeksforgeeks.org/count-set-bits-in-an-integer/. An Archive.org screen shot is attached. (Year: 2012).*

(Continued)

*Primary Examiner* — William E. Baughman
*Assistant Examiner* — Janice M. Girouard
(74) *Attorney, Agent, or Firm* — Kowert Hood Munyon Rankin and Goetzel PC; Rory D. Rankin (57) ABSTRACT

Systems, apparatuses, and methods for performing efficient memory accesses for a computing system are disclosed. In various embodiments, a computing system includes one or more computing resources and a memory controller coupled to a memory device. The memory controller determines a memory access request targets a given bank of multiple banks. An access history is updated for the given bank based on whether the memory access request hits on an open page within the given bank and a page hit rate for the given bank is determined. The memory controller sets an idle cycle limit based on the page hit rate. The idle cycle limit is a maximum amount of time the given bank will be held open before closing the given bank while the bank is idle. The idle cycle limit is based at least in part on a page hit rate for the bank.

20 Claims, 4 Drawing Sheets

(56) References Cited

U.S. PATENT DOCUMENTS

| | | | |
|---|---|---|---|
| 9,575,815 B1 | 2/2017 | Guthrie et al. | |
| 10,067,709 B2 | 9/2018 | Piga et al. | |
| 10,089,014 B2 | 10/2018 | Uppal et al. | |
| 10,318,344 B2 | 6/2019 | Gutierrez | |
| 2005/0081181 A1 | 4/2005 | Brokenshire et al. | |
| 2007/0106874 A1 | 5/2007 | Pan et al. | |
| 2008/0005383 A1 | 1/2008 | Bender et al. | |
| 2009/0150624 A1 | 6/2009 | Resnick | |
| 2009/0222625 A1 | 9/2009 | Ghosh et al. | |
| 2009/0271596 A1 | 10/2009 | Barsness et al. | |
| 2010/0250856 A1 | 9/2010 | Owen et al. | |
| 2012/0023280 A1 | 1/2012 | Lais et al. | |
| 2012/0023302 A1 | 1/2012 | Arndt et al. | |
| 2012/0059983 A1* | 3/2012 | Nellans | G06F 12/0215 711/105 |
| 2012/0233486 A1 | 9/2012 | Phull et al. | |
| 2013/0036266 A1 | 2/2013 | Naganuma et al. | |
| 2014/0281299 A1 | 9/2014 | Duluk, Jr. et al. | |
| 2014/0281365 A1 | 9/2014 | Mashey et al. | |
| 2014/0365738 A1 | 12/2014 | Hod et al. | |
| 2014/0379987 A1* | 12/2014 | Aggarwal | G06F 12/0215 711/133 |
| 2015/0006785 A1 | 1/2015 | Jayaraman et al. | |
| 2015/0052287 A1 | 2/2015 | Venkatasubramanian et al. | |
| 2015/0088805 A1 | 3/2015 | Kakarla et al. | |
| 2016/0378655 A1 | 12/2016 | Blagodurov et al. | |
| 2016/0378674 A1 | 12/2016 | Cheng et al. | |
| 2017/0262216 A1 | 9/2017 | Polkovnikov et al. | |
| 2018/0074715 A1 | 3/2018 | Farmahini-Farahani et al. | |
| 2018/0285286 A1* | 10/2018 | Srikanth | G11C 7/1072 |
| 2018/0307414 A1 | 10/2018 | Smith et al. | |

OTHER PUBLICATIONS

Ghasempour: an article titled 'HAPPY: Hybrid Address-based Page Policy in DRAMs' by Mohsen Ghasempour, et el., attached to this office action and available online at https://arxiv.org/pdf/1509.03740.pdf (Year: 2015).*

An article titled "Bit Twiddling Hacks" by Sean Eron Anderson, a screen showing a snapshot taken by archive.org on Apr. 22, 2013 disclosing a plurality of bit counting algorithms. (Year: 2013).*

Hwang, Kai, "Advanced Computer Architecture: Parallelism, Scalability, Programmability", 2011, 2nd Ed., pp. 17-29, 52-55, McGraw-Hill.

Patterson et al., "Computer Organization and Design: The Hardware/Software Interface", 2014, 5th Ed, pp. 509-510, 519-520, 531-533, Elsevier.

McCreary et al., "Automatic Determination of Grain Size For Efficient Parallel Processing", Sep. 1989, pp. 1073-1078, vol. 32, Issue 9.

Miaheshwari, Piyush, "Improving granularity and locality of data in multiprocessor execution of functional programs". Parallel Computing, Dec. 1996, pp. 1359-1372, vol. 22, Issue 10, Elsevier B.V.

Kruatrachue et al., "Grain Size Determination for Parallel Processing", IEEE Software, Jan. 1988, pp. 23-32, vol. 5, Issue 1, IEEE Computer Society Press Los Alamitos, CA, USA.

Frigo, et al., "FFTW: An Adaptive Software Architecture for the FFT", Proceedings of the 1998 IEEE International Conference on Acoustics, Speech and Signal Processing, May 15, 2998, 4 pages.

Volos, et al., "BuMP: Bulk Memory Access Prediction and Streaming", in Proceedings of the 47th Annual IEEE/ACM International Symposium on Microarchitecture, Dec. 13-17, 2014, 13 pages.

Kaseridis, et al., "Minimalist Open-page: A DRAM Page-mode Scheduling Policy for the Many-core Era", Proceedings of the 44th Annual IEEE/ACM International Symposium on Microarchitecture, Dec. 3-7, 2011, 12 pages, ACM, New York, NY, USA.

Awasthi, et al., "Prediction Based DRAM Row-Buffer Management in the Many-Core Era", International Conference an Parallel Architectures and Compilation Techniques, Oct. 10-14, 2011, 2 pages.

Erlingsson, et al., "A Cool and Practical Alternative to Traditional Hash Tables", Proc. 7th Workshop on Distributed Data and Structures (WDAS'06), Jan. 2006, 6 pages.

Qiao et al., "Fast Bloom Filters and Their Generalization", IEEE Transactions on Parallel and Distributed Systems, Jan. 2014, pp. 93-103, vol. 25, Issue 1, IEEE Computer Society, Washington, D.C, USA.

Breternitz et al., "A Segmented Bloom Filter Algorithm for Efficient Predictors", Proceedings of the 2008 20th International Symposium on Computer Architecture and High Performance Computing, Oct. 29, 2008, pp. 123-130, IEEE Computer Society, Washington, D.C., USA.

Non-Final Office Action in U.S. Appl. No. 15/649,312, dated Aug. 7, 2018, 36 pages.

Non-Final Office Action in U.S. Appl. No. 15/495,296, dated Sep. 20, 2018, 10 pages.

International Search Report and Written Opinion in International Application No. PCT/US2018/029188, dated Jul. 27, 2018, 10 pages.

First Examination Report in Indian Patent Application No. 201917044599, dated Jan. 11, 2022, 9 pages.

Non-Final Office Action in Japanese Patent Application No. 2019-557821, dated Feb. 22, 2022, 8 pages.

* cited by examiner

ADAPTIVE PAGE CLOSE PREDICTION

BACKGROUND

Description of the Related Art

When a memory access for a given thread misses in a last-level cache, a request is sent to system memory. Memory access latencies for system memory, such as off-chip dynamic random access memory (DRAM), are typically appreciable. To reduce the effect of this latency penalty and taking into account that read operations are on the critical path for program execution, read operations are assigned a higher priority than write operations. However, data bus turnaround latencies still exist. Typically, the memory bus utilizes a bi-directional shared-bus structure and switching the bus direction has an appreciable latency.

To increase bandwidth and further reduce latency, the DRAM is organized into independent banks, the DRAM supports memory access pipelining, and the DRAM stores data in a buffer from an activated row in a given bank of the multiple independent banks. However, unlike static RAM (SRAM), DRAM does not have an equal access time for each storage location. Retrieving read response data from system memory has a longer latency than sending write data to system memory. The bus turnaround latency is added after a read or write burst length is reached. Accesses to the system memory also utilize multiple, complex DRAM transactions. Each of the different DRAM transactions, such as precharge, activation/open for a row, column read access of an open row, column write access of an open row, and close of an open row, has a different respective latency. Often, the activation and precharge transactions have significantly higher latencies than the read access and write access transactions.

Particular memory accesses use less of the above transactions, such as consecutive accesses to a same, activated row of a bank. Other accesses use more of the complex DRAM transactions such as consecutive accesses to different banks where the requested row is not open and to different rows within a same bank.

The memory controller attempts to reduce scattered accesses through determining address mappings that allocate data in particular banks and rows for efficient accesses. However, multiple computing resources generate memory access requests. Examples of the computing resources are a general-purpose central processing unit (CPU), a graphics processing unit (GPU), an accelerated processing unit (APU), and so forth. Further, each of the computing resources typically execute multiple different threads, each generating memory access requests. Although each thread may generate memory access requests with spatial and temporal locality, these memory access requests are grouped with multiple other requests for scheduling purposes.

In addition to finding similar target addresses that could access a same row of a bank, at least priority levels and age are used for scheduling memory access requests for issue to memory devices of the DRAM. When locality is lost, performance reduces and power consumption increases. For example, at least the frequency increases for performing an open transaction for a targeted row or performing a close transaction of an open row before opening a targeted row. When to close a row after it is accessed is one determination by the control logic in the DRAM which affects performance and power consumption.

In view of the above, efficient methods and systems for performing efficient memory accesses for a computing system are desired.

BRIEF DESCRIPTION OF THE DRAWINGS

The advantages of the methods and mechanisms described herein may be better understood by referring to the following description in conjunction with the accompanying drawings, in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient memory accesses for a computing system are disclosed. In one embodiment, a computing system includes one or more computing resources and external system memory such as one of a variety of types of dynamic random access memory (DRAM). Examples of the computing resources include a general-purpose central processing unit (CPU), a graphics processing unit (GPU), an accelerated processing unit (APU), and so forth. The computing resources generate memory access requests. In various embodiments, a given computing resource includes a cache memory subsystem.

When the given computing resource determines a memory access request misses within the cache memory subsystem, the given computing resource sends the memory access request to a given memory controller of one or more memory controllers.

The given memory controller is coupled to a memory device associated with a target address of the memory access request. If the computing system includes multiple memory devices, then the address spaces are distributed among the multiple memory devices by the operating system. The memory controller supports mapping between the request addresses of the computing resources and addresses corresponding to storage locations in the memory device(s). In some embodiments, a memory controller is connected to a single memory device. In other embodiments, a memory controller is connected to multiple memory devices.

In an embodiment, control logic in the memory controller determines a given received memory access request targets a given bank of multiple independent banks of a memory device (e.g., a DRAM, etc.). An access history is updated for the given bank based on whether the memory access request hits or misses on an open page within the given bank. In various embodiments, the memory controller maintains a separate access history for each of the multiple banks. Such access histories could be stored and maintained in separate physical or logical entities, or could be maintained as part of a single larger entity. Various such embodiments are possible and are contemplated. In some embodiments, the memory controller may further maintain an access history for each of multiple rows within each of the multiple banks as well.

To maintain the above mentioned access histories, in one embodiment the memory controller maintains a vector of N bits for each bank. Here, N is a positive integer. The memory controller shifts a first binary value into the vector of N bits to indicate a page hit when the memory controller determines the memory access request hits on an open page within the given bank. The first binary value can be a logic high value (e.g., corresponding to a binary "1") or a logic low value (e.g., corresponding to a binary "0") based on design choice. Conversely, the memory controller shifts a second binary value different from the first binary value into the vector of N bits to indicate a page hit has not occurred (i.e., a page miss or page conflict has occurred) when the memory controller determines the memory access request does not hit on an open page within the target bank. For example, if the row buffer in the given bank does not currently store valid data (a "page miss"), then a page hit has not occurred. In such a case, an activation/open transaction has to be performed before the read or write access operation is performed. If the row buffer does store valid data but it is not the data targeted by the memory access (a "page conflict"), then a page hit has not occurred. In such a case, a close transaction and an activation/open transaction has to be performed before the read or write access operation is performed.

In various embodiments, the memory controller determines the number of bits with the first binary value in the vector of N bits (i.e., the number of indicated page hits in the N bits). For example, if N is 20 and the value used to indicate page hits is the binary value '1,' then the memory controller determines the number of 1's in the 20-bit vector. In various embodiments, N represents the most recent N accesses to the given bank. Accordingly, if the N bit vector is stored or maintained as part of a vector with more than N bits, only the most recent N bits are used. If the N bits vector is stored is maintained as a bit vector with only N bits, then bits corresponding to accesses older than the most recent N accesses have been shifted out of the N bit vector.

In some embodiments, the memory controller determines a page hit rate by determining a ratio of a number of page hits for a given bank to a number of accesses for the given bank. In some embodiments, this ratio may be determined by dividing the number of page hits by the number of accesses. For example, in an embodiment, the memory controller calculates the ratio of the count of the first binary value to a particular number of accesses in the access history (e.g., the most recent N accesses). Therefore, if N is 20 and a count of 1's in the 20-bit vector is 13, then the ratio is 13/20 or 0.65 (corresponding to 65%). In some embodiments, the memory controller keeps a count of accesses for a given bank. For example, while an N bit vector is generally used to represent an access history, there may not yet have been N accesses for a given bank. In such a case, the count of accesses for the bank (where the count is less than N) is used for the access history. In such a case, if 12 accesses have occurred so far, and the count of 1's in the first 12 accesses is 6, then the ratio is 0.5, or 50%. In various embodiments, once the number of accesses reaches N, then the N most recent accesses are used for the access history. In another embodiment, the memory controller calculates the ratio of the count of the first binary value to a count of the second binary value in the access history. If N is 20, and a count of 1's in the 20-bit vector is 14 and a count of 0's in the 20-bit vector is 6, then the ratio is 2.33. In various embodiments, the determined ratio is compared to one or more thresholds for determining how long a page will be held open as discussed below. It is noted that in some embodiments, access histories may be cleared for various reasons. In such a case, the count of accesses may begin again. For example, access histories may be cleared in response to a change in application, context, or other system or processing event. In some embodiments, context switches may cause current access histories to be swapped out and previously swapped out access histories to be swapped back in that correspond to an application or thread. These and other embodiments are possible and are contemplated.

In various embodiments, the memory controller sets an idle cycle limit based on the determined page hit rate. In the present discussion, the memory controller is described as comparing the determined ratio to various thresholds. However, it is noted that in other embodiments different values or counts may be compared to the thresholds. The idle cycle limit is a maximum amount of time to wait before closing an open page that is idle. In other words, the idle cycle limit is an amount of time to wait since a most recent access of an open page before closing the page. In various embodiments, the page may be closed before this limit is reached, but the page will not remain open longer than this limit if the page remains idle. In such an embodiment, if an amount of time equal to the idle cycle limit has been reached with no further accesses after a most-recent access of a page stored in a row buffer (i.e., an open page), then the page is closed and the contents of the row buffer are written back to the row in the given bank.

As noted, in various embodiments the memory controller compares the ratio (page hit rate) to one or more thresholds. In one embodiment, when the memory controller determines the ratio is above a high threshold, the memory controller sets the idle cycle limit to a first amount of time (e.g., a number of cycles or some other value that may indicate a duration of time). In some embodiments, the high threshold corresponds to a page hit rate that is a greater than a hit rate for a lower threshold as discussed below. When the page hit rate is determined to be relatively high (by comparison to the high threshold), it is predicted that the page is more likely to be hit on a subsequent memory access and the page is left open for a longer period of time than would otherwise be the case.

In contrast, when the memory controller determines the page hit rate is below a low threshold (lower than the above mentioned high threshold), the memory controller sets the idle cycle limit to a second amount of time that is lower than the first amount of time. In such a case, it is predicted that the likelihood of a page hit on a subsequent memory access operation is relatively low (e.g., compared to the above scenario where the page hit rate is higher), so the maximum amount of time the page will be held open is lower. In some cases the page may be closed immediately. In various embodiments, one or more other intermediate thresholds between the high threshold and the low threshold can be used. In such embodiments, the idle cycle limit is set to a unique value based on the comparison of the determined ratio to the multiple thresholds.

In various embodiments, control registers store programmable values for the above discussed thresholds. Programmable registers may also be used to store values indicating idle cycle limits and/or access history lengths (i.e., how many most recent accesses are used to represent the access history). For example, in some embodiments, the memory controller supports a vector length of 1 to M, where M is greater than N. A control register stores the value N, which can be set to any value from 1 to M. It is noted that while the present description refers to using a ratio of page hits to memory accesses for purposes of comparison to thresholds, in other embodiments the number of page hits alone may be used. For example, in an embodiment where the last N memory accesses is consistently used as a history of memory accesses, then a count of the number of hits during those N accesses serves to represent the page hit rate. Those skilled in the art will appreciate these and other embodiments are possible for tracking page hit rates. These and other embodiments are possible and are contemplated.

Figure 1:
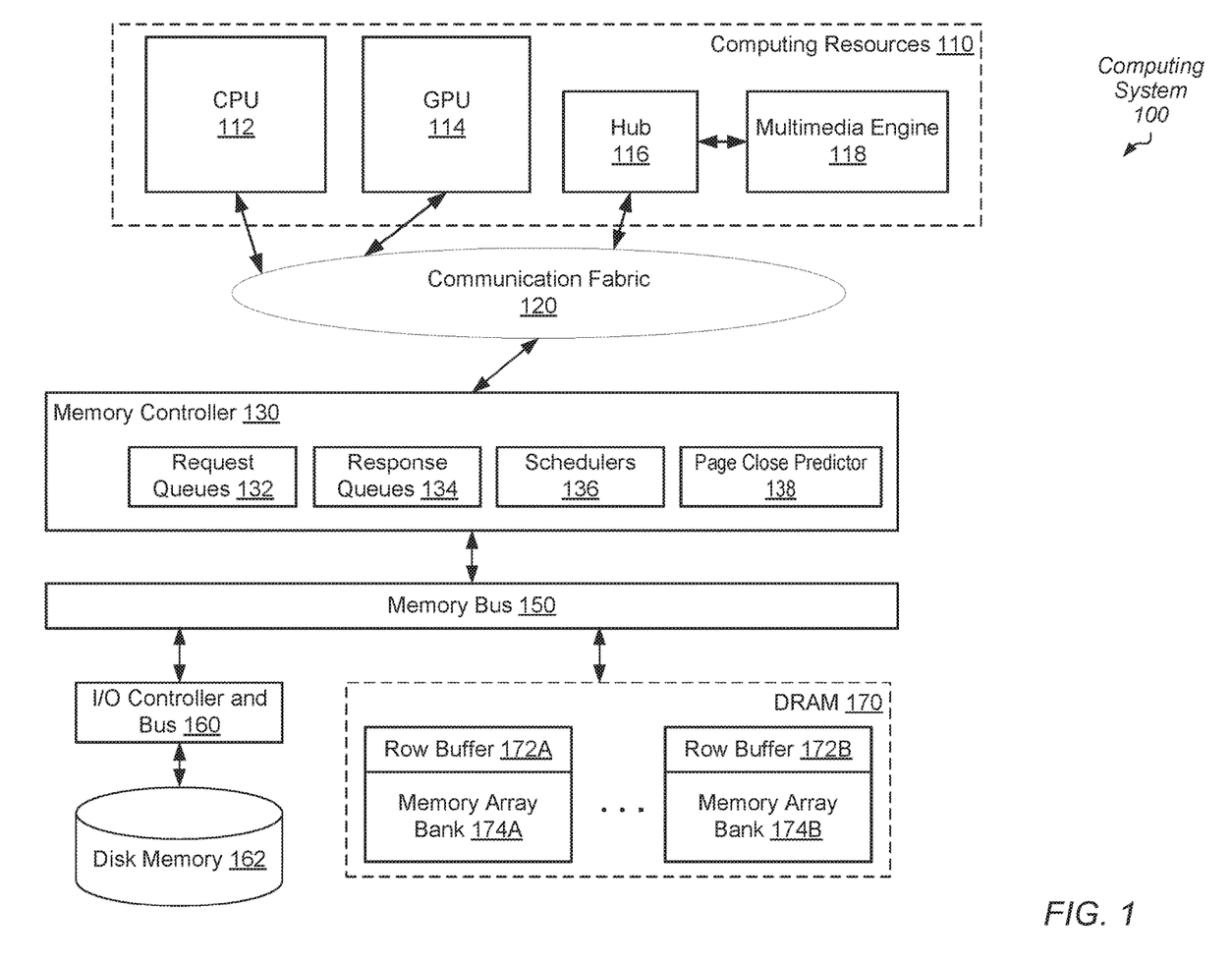
FIG. 1 is a block diagram of one embodiment of a computing system.

Referring to FIG. 1, a generalized block diagram of one embodiment of a computing system 100 is shown. As shown, computing system 100 includes communication fabric 120 between each of memory controller 130 and computing resources 110. In the illustrated embodiment, the computing resources include central processing unit (CPU) 112, graphics processing unit (GPU) 114 and Hub 116. Hub 116 is used for communicating with Multimedia Engine 118. Although a single memory controller 130 is shown, in other embodiments, another number of memory controllers are used in computing system 100.

In some embodiments, the components of computing system 100 are individual dies on an integrated circuit (IC), such as a system-on-a-chip (SOC). In other embodiments, the components are individual dies in a system-in-package (SiP) or a multi-chip module (MCM). In one embodiment, computing system 100 is a stand-alone system within a mobile computer, a smart phone, a smartwatch, or a tablet; a desktop; a server; or other. The CPU 112, GPU 114 and Multimedia Engine 118 are examples of computing resources capable of generating memory access requests. Although not shown, in other embodiments, other types of computing resources are included in computing resources 110.

In various embodiments, memory controller 130 receives memory access requests from computing resources 110 via the communication fabric 120 and sends the memory access requests to one or more of off-chip disk memory 162 and system memory, which is implemented as off-chip dynamic random access memory (DRAM) 170. Memory controller 130 also receives responses from DRAM 170 and disk memory 162 and sends the responses to a corresponding source of the request in computing resources 110.

Each of the one or more processor cores in CPU 112 includes circuitry for executing instructions according to a given selected instruction set architecture (ISA). In various embodiments, each of the processor cores in CPU 112 includes a superscalar, multi-threaded microarchitecture used for processing instructions of the given ISA. In an embodiment, GPU 114 includes a high parallel data microarchitecture with a significant number of parallel execution lanes. In one embodiment, the microarchitecture uses single-instruction-multiple-data (SIMD) pipeline for the parallel execution lanes. Multimedia Engine 118 includes processors for processing audio data and visual data for multimedia applications.

In one example, an accelerated processing unit (APU), a display controller, an audio processor, and so forth, are additional candidates to be included in processing units 110. An example of an APU is a CPU integrated on a same die with a GPU, a FPGA, or other processing unit, thus improving data transfer rates between these units while reducing power consumption. In other embodiments, the APU includes video processing and other application-specific accelerators.

In various embodiments, communication fabric 120 transfers traffic back and forth between computing resources 110 and memory controller 130 and includes interfaces for supporting respective communication protocols. In some embodiments, communication fabric 120 includes at least queues for storing requests and responses, selection logic for arbitrating between received requests before sending requests across an internal network, logic for building and decoding packets, and logic for selecting routes for the packets.

In some embodiments, the address space of the computing system 100 is divided among at least CPU 112, GPU 114 and Hub 116 and one or more other components such as input/output peripheral devices (not shown) and other types of computing resources. Memory maps are maintained for determining which addresses are mapped to which component, and hence to which one of CPU 112, GPU 114 and Hub 116 a memory request for a particular address should be routed.

As software applications access more and more data, the memory subsystem is utilized more heavily and memory access latencies become more crucial. More on-chip memory storage can be used to reduce these latencies. For example, one or more of computing resources 110 include cache memory subsystems to reduce memory latencies for a respective processor core. In addition, in some embodiments, a shared cache memory subsystem is used by processor cores as a last-level cache (LLC) before accessing the off-chip DRAM 170 and/or the off-chip disk memory 162.

While a reduced miss rate is achieved by the additional memory provided by cache memory subsystems, there is limited amount of on-die area to use for cache memory subsystems. Consequently, memory access requests are still sent to the off-chip memory such as the DRAM 170 and/or the disk memory 162.

The cache memory subsystems (not shown) in the computing resources 110 include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block is varied according to design choice, and may be of any size. In addition, each of the terms "cache tag", "cache line tag", and "cache block tag" is interchangeable. In various embodiments, the cache memory subsystems are implemented as a hierarchy of caches. As used herein, the term "access" refers to performing a memory read request or a memory write request operation that results in a cache hit if the requested data of a corresponding request address resides in the cache. Alternatively, the memory access request results in a cache miss if the requested data does not reside in the cache.

Memory controller 130 sends scheduled memory access requests to off-chip DRAM 170 through the memory bus 150. In various embodiments, off-chip DRAM 170 is filled with data from the off-chip disk memory 162 through the I/O controller and bus 160 and the memory bus 150. A corresponding cache fill line with the requested block is conveyed from the off-chip DRAM 170 to a corresponding one of the cache memory subsystems in processing units 110 in order to complete the original memory access request. The cache fill line is placed in one or more levels of caches.

In various embodiments, off-chip DRAM 170 is a type of dynamic random-access memory that stores each bit of data in a separate capacitor within an integrated circuit. The capacitor can be either charged or discharged. These two states are used to represent the two logical values of a bit. The DRAM 170 utilizes a single transistor and a capacitor per bit. Compared to six transistors used in on-chip synchronous RAM (SRAM), the DRAM reaches higher densities. Unlike HDDs and flash memory, the DRAM 170 is volatile memory, rather than non-volatile memory. The DRAM 170 loses its data relatively quickly when a power supply is removed.

In an embodiment, off-chip DRAM 170 includes a multi-channel memory architecture. This type of architecture increases the transfer speed of data to the memory controller 130 by adding more channels of communication between them. In an embodiment, the multi-channel architecture utilizes multiple memory modules and a motherboard and/or a card capable of supporting multiple channels. In another embodiment, DRAM 170 utilizes three-dimensional integrated circuits (3D ICs) to provide system memory. In such an embodiment, the 3D integrated DRAM provides both low-latency interconnects and a significantly large amount of additional on-chip memory storage to reduce off-chip memory accesses. In various embodiments, DRAM 170 is used as system memory for computing system 100. Other memory technologies for system memory that use a row-based access scheme including one or more row buffers or other equivalent structures are possible and contemplated. Examples of other memory technologies include phase-change memories, spin-torque-transfer resistive memories, memristors, and so forth.

As shown, DRAM 170 includes multiple memory array banks 174A-174B. Each one of the banks 174A-174B includes a respective one of the row buffers 172A-172B. Each one of the row buffers 172A-172B stores data in an accessed row of the multiple rows within the memory array banks 174A-174B. The accessed row is identified by a DRAM address in the received memory access request. Control logic within DRAM 170 performs complex transactions such as activation and precharge of data and control lines within DRAM 170 once to access an identified row and once to put back the modified contents stored in the row buffer to the identified row.

In various embodiments, DRAM 170 includes one or more memory channels, one or more memory modules or devices per channel, one or more ranks per memory module, one or more banks per rank, and one or more rows per bank. Typically, each row stores a page of data. The size of the page is chosen based on design considerations. The page can be one kilobyte (1 KB), four kilobytes (4 KB), or any size based on design choices. Accesses of DRAM 170 use complex transactions occurring within DRAM 170. In various embodiments, memory bus 150 utilizes a bi-directional shared-bus structure.

One example of a protocol for a respective interface to the memory controller 130 is a double data rate (DDR) type of protocol. The protocol determines values used for information transfer, such as a number of data transfers per clock cycle, signal voltage levels, signal timings, signal and clock phases and clock frequencies. Protocol examples include DDR2 SDRAM, DDR3 SDRAM, DDR4 SDRAM, GDDR4 (Graphics Double Data Rate, version 4) SDRAM, and GDDR5 (Graphics Double Data Rate, version 5) SDRAM. The memory controller 130 includes control circuitry for interfacing to the memory channels and following a corresponding protocol.

If a cache miss occurs in each hierarchical level of the cache memory subsystem, then a memory access request is generated by the corresponding one of the computing resources 110. Memory controller 130 translates the target addresses of memory access requests received from computing resources 110 via communication fabric 120. In various embodiments, control logic in memory controller 130 determines a target bank of memory array banks 174A-174B and a target page within the target bank for a received memory access request.

As shown, memory controller 130 includes request queues 132 for queuing memory access requests received from computing resources 110 via communication fabric 120. Memory controller 130 also has a response queue(s) 134 for storing responses received from DRAM 170. In an embodiment, request queues 132 include one or more queues for storing memory access requests. In another embodiment, request queues 132 include a read queue for storing memory read requests and a separate write queue for storing memory write requests. In other embodiments, request queues 132 include a unified queue for storing both memory read requests and memory write requests.

In yet other embodiments, request queues 132 include one or more queues for storing received memory access requests and a separate queue for storing scheduled memory access requests selected from the one or more queues. Schedulers 136 include one or more scheduling blocks for selecting memory access requests stored in request queues 132 for out-of-order issue to DRAM 170. Therefore, memory controller 130 supports out-of-order issue of the memory access requests to DRAM 170 based on priorities and target addresses. In some embodiments, memory controller 130 also supports out-of-order issue of the responses to computing resources 110 based on at least priorities. In various embodiments, schedulers 136 in memory controller 130 schedules the issue of the stored memory access requests based on a quality-of-service (QoS) or other priority information, age, a process or thread identifier (ID), and a relationship with other stored requests such as targeting a same memory channel, targeting a same rank, targeting a same bank and/or targeting a same page.

In various embodiments, when a given memory access request is the only memory access request targeting a given bank of banks 174A-174B and currently stored in the request queues 132, Page Close Predictor 138 is used to determine when to close a given row buffer of row buffers 172A-172B in the given bank. The given row buffer currently stores a page of data in the given bank which is accessed by a read operation or a write operation of the given memory access request. Since there is no next memory access request targeting the given bank stored in request queues 132, it is currently unknown whether the currently open page will be accessed by the next memory access request targeting the given bank. Therefore, Page Close Predictor 138 determines when to close the given row buffer in the given bank.

Page Close Predictor 138 is also referred to as predictor 138. In various embodiments, predictor 138 maintains a respective access history for each one of the banks 174A-174B. Maintaining an access history for the banks 174A-174B, rather than the multiple rows within a bank, reduces an amount of combinatorial logic and number of sequential elements used to support the access histories. In one embodiment, predictor 138 maintains a vector of N bits to monitor the access history. Here, N is a positive non-zero integer.

Predictor 138 shifts a first binary value into the vector of N bits to indicate a page hit when predictor 138 determines the memory access request hits on an open page within the targeted one of the banks 174A-174B. The first binary value can be a logic high value or a logic low value based on design choice. Predictor 138 shifts a second binary value different from the first binary value into the vector of N bits to indicate a page hit has not occurred when the memory controller determines the memory access request does not hit on an open page within the target bank. In an embodiment, the first binary value is a logic high value '1' and the second binary value is a logic low value '0.'

In various embodiments, predictor 138 counts a number of bits with the first binary value in the vector of N bits. In an embodiment, predictor 138 counts a number of accesses to the targeted bank of banks 174A-174B prior to reaching N accesses. When at least N accesses are performed for the targeted bank, in an embodiment, predictor 138 uses the last, or most-recent, N accesses for the access history. In various embodiments, predictor 138 determines page hits over an access history for the given bank. For example, in an embodiment, predictor 138 calculates the ratio of the count of the first binary value to the total number of accesses in the access history such as N. In an example, if N is 20 and a count of 1's in the 20-bit vector is 14, then the ratio is 0.7, or 70%. If only 12 accesses have occurred so far, and the count of 1's in the first 12 accesses is 3, then the ratio is 0.25, or 25%. In another embodiment, predictor 138 calculates the ratio of the count of the first binary value to a count of the second binary value in the access history. If N is 20, and a count of 1's in the 20-bit vector is 14 and a count of 0's in the 20-bit vector is 6, then the ratio is 2.33. Either representation of the ratio is compared to corresponding one or more thresholds.

In various embodiments, predictor 138 sets an idle cycle limit based on the calculated ratio. The idle cycle limit is a maximum amount of time to wait while an open page is idle before closing the page. In various embodiments, predictor 138 compares the calculated ratio to one or more thresholds. In one embodiment, when predictor 138 determines the calculated ratio is above a high threshold, predictor 138 sets the idle cycle limit to a first latency. In some embodiments, the first latency is a relatively large value since the amount of page hits for the targeted bank is relatively high. Accordingly, it is predicted that the chance of the page to be accessed by the next memory access operation is relatively high, so the row buffer should be left open after the most recent access for a relatively long time.

In contrast, when predictor 138 determines the ratio is below a low threshold, predictor 138 sets the idle cycle limit to a second latency. In some embodiments, the second latency is a relatively small value since the amount of page hits for the bank is relatively low. Accordingly, it is predicted that the chance of the open page to be accessed by the next memory access operation is relatively low. Therefore, the row buffer should be left open after the most recent access for a relatively short time, and in some cases, closed immediately. When the ratio is between the high threshold and the low threshold, predictor 138 sets the idle cycle limit to a third latency between the relatively large first latency and the relatively small second latency. In an embodiment, one or more other intermediate thresholds are used in addition to the high threshold and the low threshold.

In various embodiments, memory bus 150 supports sending data traffic in a single direction for a given amount of time, such as during a given mode of the read mode and the write mode, and then sends data traffic in the opposite direction for another given amount of time such as during the other mode of the read mode and the write mode. In an embodiment, memory bus 150 utilizes at least a command bus and a data bus, and memory bus 150 supports a read mode for sending data traffic on the data bus from DRAM 170 to memory controller 130. Additionally, memory bus 150 supports a write mode for sending data traffic on the data bus from memory controller 130 to DRAM 170.

The off-chip disk memory 162 may provide a non-volatile, random access secondary storage of data. In one embodiment, the off-chip disk memory 162 may include one or more hard disk drives (HDDs). The HDDs typically include one or more rotating disks, each coated with a magnetic medium. These disks rotate at a rate of several thousand rotations per minute. A magnetic actuator is responsible for positioning magnetic read/write devices over the rotating disks. In another embodiment, the off-chip disk memory 162 utilizes a Solid-State Disk (SSD). A Solid-State Disk may also be referred to as a Solid-State Drive. An SSD may emulate a HDD interface, but an SSD utilizes solid-state memory to store persistent data rather than electromechanical devices as found in a HDD. For example, an SSD may comprise banks of Flash memory.

Figure 2:
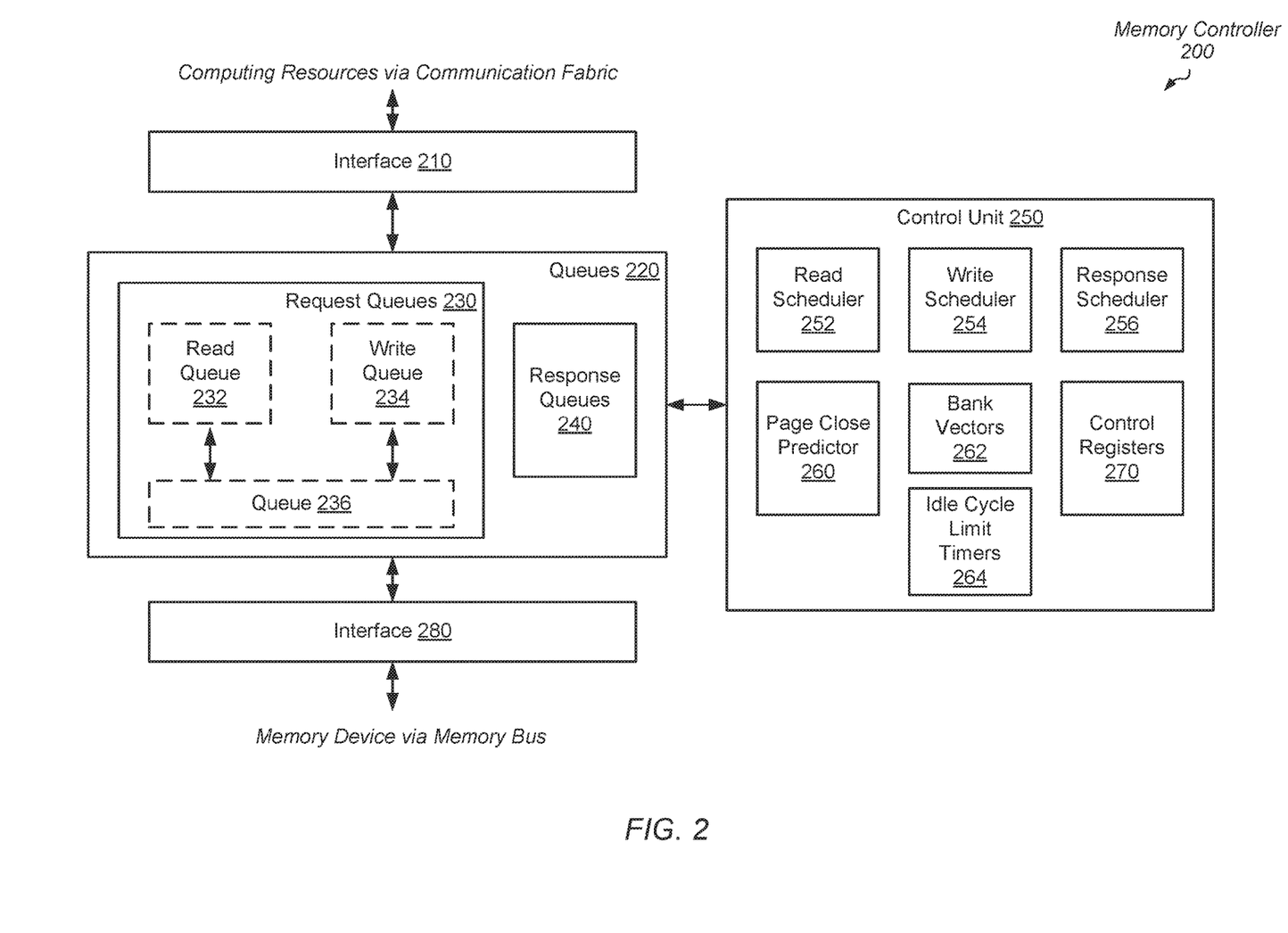
FIG. 2 is a block diagram of one embodiment of a memory controller.

Referring to FIG. 2, a generalized block diagram of one embodiment of a memory controller 200 is shown. In the illustrated embodiment, memory controller 200 includes an interface 210 to computing resources via a communication fabric, queues 220 for storing received memory access requests and received responses, control unit 250 and an interface 280 to a memory device via at least a data bus of a memory bus. Each of interfaces 210 and 280 supports respective communication protocols.

In an embodiment, queues 220 includes a read queue 232 for storing received read requests and a separate write queue 234 for storing received write requests. In other embodiments, queues 220 includes a unified queue for storing both memory read requests and memory write requests. In one embodiment, queues 220 includes queue 236 for storing scheduled memory access requests selected from read queue 232, write queue 234 or a unified queue if one is used. In some embodiments, control registers 270 store an indication of a current mode. For example, the off-chip memory data bus and memory device support either a read mode or a write mode at a given time. Therefore, traffic is routed in a given single direction during the current mode and changes direction when the current mode ends.

In some embodiments, read scheduler 252 includes arbitration logic for selecting read requests from the read queue 232 out-of-order. Read scheduler 252 schedules the out-of-order issue of the stored requests within the read queue 232 to the memory device based on a quality-of-service (QoS) or other priority information, age, a process or thread identifier (ID), and a relationship with other stored requests such as targeting a same memory channel, targeting a same rank, targeting a same bank and/or targeting a same page. Write scheduler 254 includes similar selection logic for the write queue 234. In an embodiment, response scheduler 256 includes similar logic for issuing, based on priorities, responses out-of-order to the computing resources, which were received from the memory device.

In various embodiments, when a given memory access request is the only memory access request currently stored in read queue 232 or write queue 234, which targets a given bank, Page Close Predictor 260 is used to determine when to close a given row buffer in the given bank. For example, during a read burst, the given row buffer currently stores a page of data in the given bank which is accessed by a given memory read request. Since there is no next memory read request targeting the given bank stored in read queue 232, it is currently unknown whether the currently open page will be accessed by a next memory access request targeting the given bank. Therefore, Page Close Predictor 260, which is also referred to as predictor 260, determines when to close the given row buffer in the given bank.

In various embodiments, predictor 260 includes the functionality of predictor 138 (of FIG. 1). In an embodiment, bank vectors 262 includes an M-bit vector for each of the banks in a memory device coupled to the memory controller 200. A programmable register in control registers 270 stores the value N, which can be set to any value from 1 to M. Each of N and M are positive, non-zero, integers and N is less than or equal to M. Therefore, the length of the access history for each bank is adjustable. In an embodiment, a programmable register in control registers 270 stores the value N.

In various embodiments, predictor 260 shifts a logic high value '1' into a given N-bit vector of bank vectors 262 to indicate a page hit when predictor 260 determines a memory access request hits on an open page within a targeted bank. In some embodiments, predictor 260 shifts a logic low value '0' into the given N-bit vector of bank vectors 262 to indicate a page hit has not occurred when predictor 260 determines the memory access request does not hit on an open page within the target bank (e.g., a page miss or page conflict has occurred). In other embodiments, the use of the logic high value '1' and the logic low value '0' to indicate whether a page hit has occurred are reversed.

In other embodiments, predictor 260 determines a memory request misses on a closed page within the targeted bank, which results in a page miss. However, predictor 260 determines the memory request would have hit on an open page if the page was not yet closed. Such a condition is referred to as a page stale hit. In such embodiments, predictor 260 shifts a logic high value '1', rather than a logic low value '0', into the given N-bit vector of bank vectors 262 to indicate a page stale hit. If the idle cycle limit is increased, and thus, the page is not closed as soon, then the access corresponding to the memory request can change from a page miss to a page hit in the future. Inserting a value that indicates a page hit, such as the logic high value '1', into the given N-bit vector of bank vectors 262 helps to increase the page hit rate, which increases the idle cycle limit.

In yet other embodiments, predictor 260 determines a memory request misses on a closed page within the targeted bank, which, again, results in a page miss. However, predictor 260 determines the memory request would have also missed on an open page if the page was not yet closed, which would have resulted in a costly page conflict. Such a condition is referred to as a page non-stale hit miss. In such embodiments, predictor 260 shifts a logic low value '0' into the given N-bit vector of bank vectors 262 to indicate a page non-stale hit miss. If the idle cycle limit is decreased, and thus, the page is closed sooner, then the access corresponding to the memory request should not change from a page miss to a page conflict in the future. Inserting a value that indicates a page miss, such as the logic low value '0', into the given N-bit vector of bank vectors 262 helps to decrease the idle cycle limit. Again, in other embodiments, the use of the logic high value '1' and the logic low value '0' to indicate whether a page hit has occurred are reversed.

In various embodiments, predictor 260 counts a number of bits with the logic high value '1' in the N-bit vector of bank vectors 262 when the logic high value '1' is selected to indicate a page hit. In an embodiment, predictor 262 counts a number of accesses to the targeted bank prior to reaching N accesses. When at least N accesses are performed for the targeted bank, in an embodiment, predictor 262 uses the last, or most-recent, N accesses for the access history. In some embodiments, predictor 260 additionally counts a number of bits with the logic low value '0' in the N-bit vector of bank vectors 262 when the logic high value '0' is selected to indicate a page hit has not occurred, but rather a page miss or a page conflict occurred.

In various embodiments, predictor 260 determines a page hit rate over an access history for the given bank. Predictor 260 can use one or more of the counts and the length N to determine the rate corresponding to page hits over an access history for the given bank. In various embodiments, predictor 260 sets the idle cycle limit for the given bank based on a calculated ratio corresponding to the page hit rate. The idle cycle limit is a maximum amount of time to wait while an open page is idle before closing the page. In various embodiments, idle cycle limit timers 264 include a respective idle cycle limit timer for each of the banks in a memory device coupled to the memory controller 200.

Multiple programmable registers in control registers 270 store one or more idle latencies, each for a particular range between two thresholds. In an embodiment, a first idle cycle limit is stored in control registers 270 for calculated ratios above a relatively high threshold. A second idle cycle limit less than the first idle cycle limit is stored in control registers 270 for calculated ratios between the relatively high threshold and a relatively low threshold. A third idle cycle limit less than the second idle cycle limit is stored in control registers 270 for calculated ratios below the relatively low threshold. In other embodiments, other idle latencies are stored in control registers 270 for calculated ratios between other intermediate thresholds.

In various embodiments, predictor 260 compares the calculated ratio to one or more thresholds. In an embodiment, one or more programmable registers in control registers 270 stores one or more thresholds to compare to the calculated ratio for the given bank. In some embodiments, each of the multiple banks use the same one or more thresholds. In other embodiments, a particular set of one or more thresholds are used for a group of one or more banks of the multiple banks. The number of idle latencies to use is based on the number of thresholds used. For example, if one threshold is used, two idle latencies are used based on whether the corresponding ratio is above or below the single threshold. If two thresholds are used, then three idle latencies are used, and so on.

The initial idle cycle limit values are stored in programmable registers in control registers 270 as described earlier. In various embodiments, the higher the calculated ratio determined by predictor 260, the higher is the idle cycle limit since the amount of page hits for the targeted bank is relatively high. Accordingly, it is predicted that the chance of the page to be accessed by the next memory access operation is relatively high, so the row buffer should be left open after the most recent access for a relatively long time. In contrast, the lower the calculated ratio determined by predictor 260, the lower is the idle cycle limit since the amount of page hits for the targeted bank is relatively low. Accordingly, it is predicted that the chance of the page to be accessed by the next memory access operation is relatively low, so the row buffer should be closed relatively soon after the most recent access.

Figure 3:
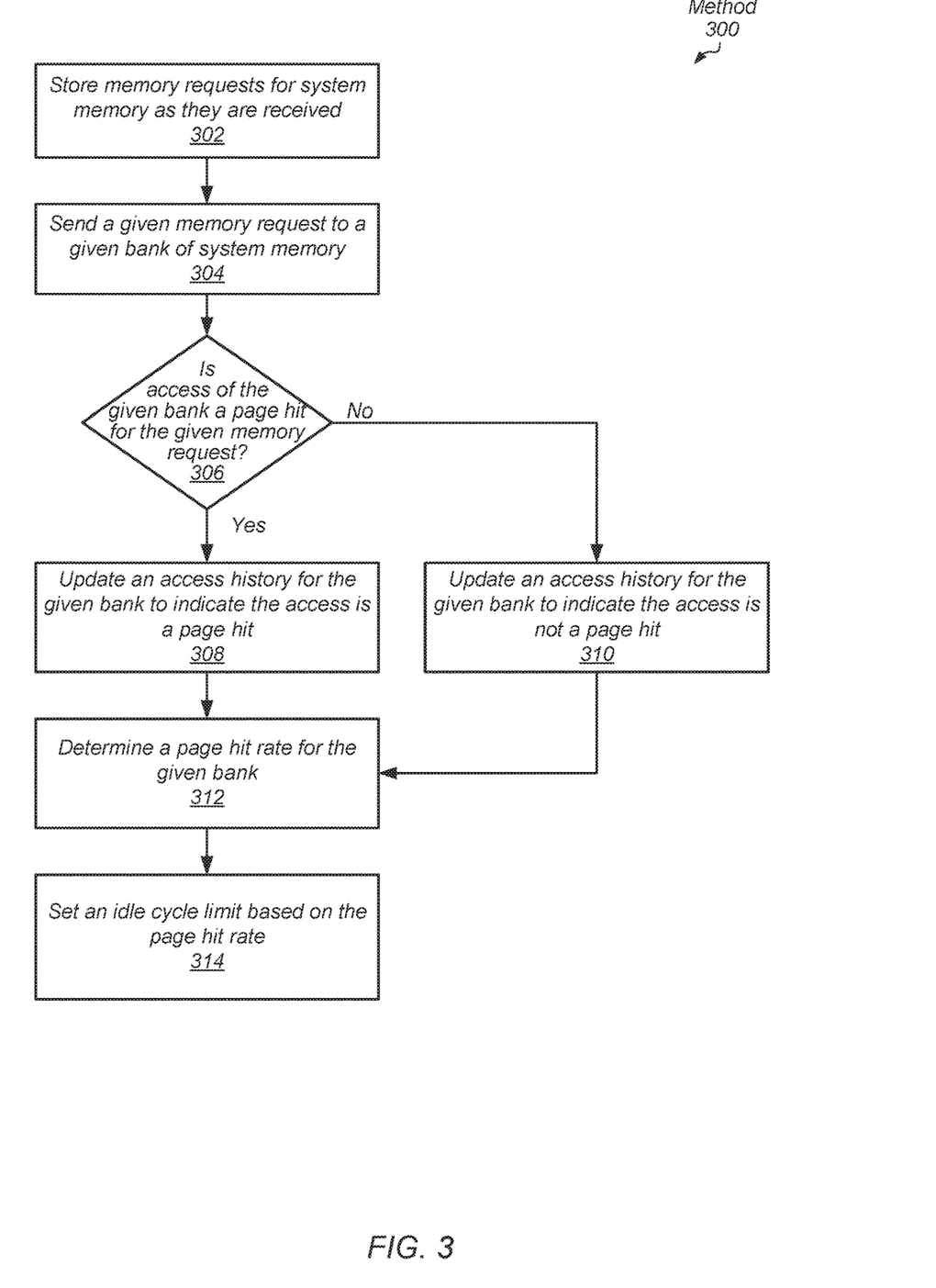
FIG. 3 is a flow diagram of one embodiment of a method for updating page close prediction logic based on access history.

Referring now to FIG. 3, one embodiment of a method 300 for updating page close prediction logic based on access history is shown. For purposes of discussion, the steps in this embodiment (as well as in FIG. 4) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

One or more computing resources execute computer programs, or software applications. Examples of a computing resource are given earlier. When executing the computer programs, a processor of one or more processors in a given computing resource processes instructions of a given thread. The processor searches a cache memory subsystem when the requested data is not in a first level cache. If the processor determines the requested data is not in the cache memory subsystem, then a memory access request for the given thread is generated. A memory controller stores memory access requests for system memory as they are received (block 302).

A given memory access request is sent from the memory controller to a given bank of multiple banks in the system memory (block 304). In some embodiments, the memory access requests are scheduled for out-of-order issue to the memory device. If the memory access of the given bank for the given memory request is a page hit ("yes" branch of the conditional block 306), then an access history for the given bank is updated to indicate the access is a page hit (block 308). As described earlier, in one embodiment, an N-bit vector has a first binary value shifted into it. For example, when N is 20, the 20-bit vector has a logic high value '1' shifted into it when the logic high value '1' is selected to indicate a page hit.

If the access of the given bank for the given memory request is not a page hit ("no" branch of the conditional block 306), then an access history for the given bank is updated to indicate the access is not a page hit (block 310). For example, when N is 20, the 20-bit vector has a logic low value '0' shifted into it when the logic low value '0' is selected to indicate a page hit has not occurred. In an embodiment, a page hit rate for the given bank is determined (block 312). Continuing with the above example when the logic high value '1' is selected to indicate a page hit, in an embodiment, a count of 1 's in the 20-bit vector is compared to N, which is 20. The resulting ratio is 12/20, or 0.6 (or 60%). The ratio can be used to indicate the page hit rate. In another embodiment, the count of 1 's in the 20-bit vector is compared to a count of 0's in the 20-bit vector, which is 8. The resulting ratio is 12/8, or 1.5. The ratio can be used to indicate the page hit rate. In yet other embodiments, the count of 1 's in the 20-bit vector is alone used to indicate the page hit rate when the logic high value '1' is selected to indicate a page hit.

An idle cycle limit for the given bank is set based on the above ratio (block 314). As described earlier, the idle cycle limit is a maximum amount of time the given bank will be held open before closing the given bank while the bank is idle. For example, the determined ratio is compared to one or more thresholds. The result(s) of the comparison(s) is used to select one of multiple initial amounts of time. Once a memory access completes for an open page in the given bank, the idle cycle limit is initialized based on the calculated page hit rate, and a corresponding counter increments from zero to the selected idle cycle limit, or the counter decrements from the selected idle cycle limit to zero. Therefore, the idle cycle limit is an amount of time, and in some embodiments, the amount of time is measured by a number of clock cycles. Other ranges of values can be used in the counter to provide a time duration equal to the selected idle cycle limit. If the duration of the selected idle cycle limit elapses before a subsequent access occurs for the open page, then the open page is closed in the given bank.

Figure 4:
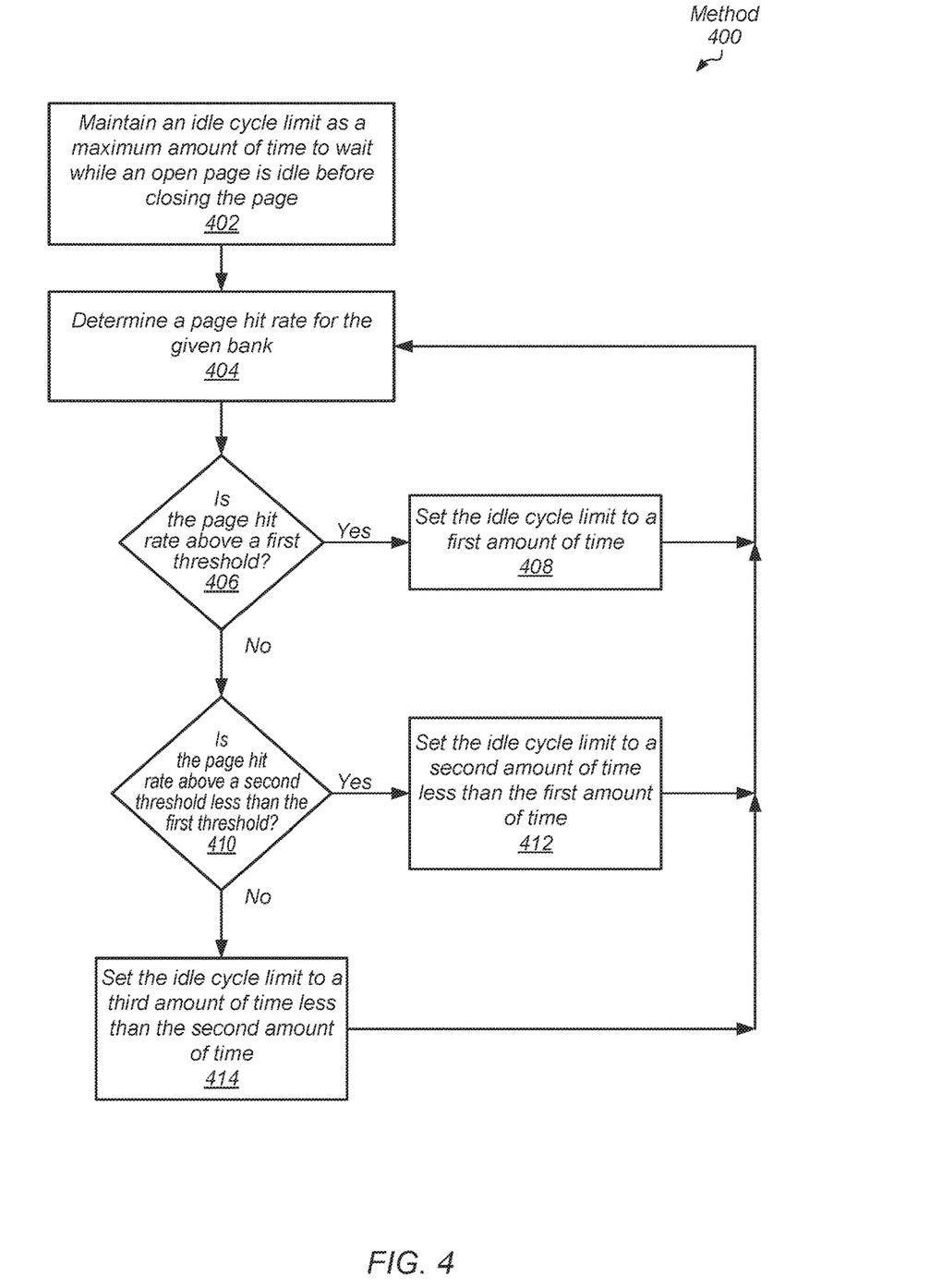
FIG. 4 is a flow diagram of one embodiment of a method for updating idle latencies between row accesses based on access history.

Referring to FIG. 4, another embodiment of a method 400 for updating idle latencies between row accesses based on access history is shown. An idle cycle limit is maintained as a maximum amount of time to wait while an open page is idle before closing the page (block 402). In various embodiments, programmable registers store initial values for an idle cycle limit for a given bank of multiple banks in a memory device. A counter is loaded with a selected one of the multiple initial values, and the counter is updated by incrementing or decrementing each clock cycle once an access completes on an open page in the given bank. The counter stops being updated when a subsequent access occurs on the open page in the given bank. However, if a subsequent access does not occur prior to the counter reaching an end value, such as zero or the selected initial idle cycle limit, then the counter stops being updated. The end value of the counter is used by other control logic to indicate the open page is to be closed.

In some embodiments, an initial value stored in a programmable register to be the idle cycle limit for the given bank is a given value set prior to processing a workload. Therefore, the idle cycle limit is a static value and can be set based on past simulations. The initial static value can be based on the latency between two consecutive page hits within the given bank, the latency between two consecutive page accesses within the given bank, or other. In other embodiments, the initial value is determined to be an average latency between two page hits within the given bank for a given page hit rate. In such embodiments, a separate counter is maintained to measure the latency. Therefore, the idle cycle limit is a dynamic value based on the processing of a current workload. Similar to the static initial value, the dynamic initial value can be based on the latency between two consecutive page hits within the given bank, the latency between two consecutive page accesses within the given bank, or other. A page hit rate for the given bank is determined (block 404). As described earlier, in some embodiments, at least a count of a particular logic value stored in an N-bit vector is used to determine the page hit rate. The particular logic value is selected to indicate a page hit occurred during an access in a given bank. In some embodiments, the particular logic value is inserted into the N-bit vector by shifting when a page hit occurs. If the page hit rate is above a first threshold ("yes" branch of the conditional block 406), then the idle cycle limit is set to a first amount of time (block 408). As described above, in some embodiments, the first amount of time is a static value. In other embodiments, the first amount of time is a dynamic value. In an embodiment, a separate counter is maintained to measure the selected latency and a separate first register is used to store an updated average when the page hit rate is above the first threshold.

If the page hit rate is not above the first threshold ("no" branch of the conditional block 406), and the ratio is above a second threshold less than the first threshold ("yes" branch of the conditional block 410), then the idle cycle limit is set to a second amount of time less than the first amount of time (block 412). In some embodiments, the second amount of time is a static value. In other embodiments, the second amount of time is a dynamic value. In an embodiment, the same counter is maintained to measure the latency between consecutive page hits or consecutive page accesses for the given bank, and a separate second register different from the first register is used to store an updated average when the page hit rate is below the first threshold but above the second threshold. However, if the page hit rate is not above the second threshold ("no" branch of the conditional block 410), then the idle cycle limit is set to a third amount of time less than the second amount of time (block 414). The third amount of time is maintained in a static manner or a dynamic manner similar to the first amount of time and the second amount of time. For dynamic values, in an embodiment, the same counter is maintained to measure the latency between consecutive page hits or consecutive page accesses for the given bank, and a separate third register is used to store an updated average when the page hit rate is below the second threshold.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A computing system comprising:
   a communication fabric;
   one or more computing resources configured to generate memory access requests; and
   a memory controller coupled to receive the memory access requests via the communication fabric;
   wherein in response to receiving a given memory access request, the memory controller is configured to:
      determine the given memory access request targets a given bank of a plurality of banks of a memory device;
      maintain an access history for memory accesses of the given bank, wherein the access history indicates how many of the memory accesses were a page hit;
      store a value, based at least in part on a calculated latency that is calculated based on two or more page hits to the given bank, indicative of a maximum amount of time the given bank will be held open before closing the given bank while the given bank is idle; and
      close the given bank responsive to determining the given bank has been idle for the maximum amount of time.

2. The computing system as recited in claim 1, wherein the memory controller is configured to compare a threshold to a determined page hit rate comprising a number of page hits for the given bank during a most recent N memory accesses of the given bank.

3. The computing system as recited in claim 1, wherein the access history for the given bank comprises a bit vector with N bits representing N most recent memory accesses of the given bank, wherein each bit of the bit vector indicates whether a page hit did or did not occur for a corresponding memory access.

4. The computing system as recited in claim 1, further comprising an idle cycle timer configured to determine how long the given bank has been idle, wherein responsive to detecting a memory access to the given bank, the idle cycle timer is initialized to a value stored in one of a plurality of programmable control registers, wherein each of the plurality of programmable control registers is configured to store a different maximum amount of time a corresponding bank will be held open while idle.

5. The computing system as recited in claim 3, wherein to determine a page hit rate, the memory controller is configured to count a number of bits of the N bits of the bit vector with a first binary value.

6. The computing system as recited in claim 1, wherein the memory controller:
   comprises a bit vector for each bank of a memory device; and
   is configured to:
      shift a bit indicating a page hit into a given bit vector corresponding to a given bank of the memory device, responsive to a page hit on the given bank; and
      shift a bit indicating a page miss into the given bit vector, responsive to a page miss on the given bank.

7. The computing system as recited in claim 6, wherein in response to receiving a given memory access request, the memory controller is further configured to:
   identify the given bit vector corresponding to the given bank; and
   determine a ratio of bits in the given bit vector that indicate page hits to a number of bits in the given bit vector.

8. The computing system as recited in claim 7, wherein the memory controller is configured to:
   set the maximum amount of time to a first amount of time, responsive to determining the ratio is above a first threshold; and
   set the maximum amount of time to a second amount of time that is less than the first amount of time, responsive to determining the ratio is above a second threshold that is lower than the first threshold.

9. The computing system as recited in claim 1, wherein the calculated latency is an average latency between the two or more page hits to the given bank.

10. A method, comprising:
   generating, by one or more computing resources, memory access requests for data stored in a memory device;
   receiving the memory access requests by a memory controller comprising a bit vector for each bank of a plurality of banks of a memory device;

in response to receiving a given memory access request:
  determining, by the memory controller, the given memory access request targets a given bank of the plurality of banks of the memory device;
  maintaining an access history for memory accesses of the given bank, wherein the access history indicates how many of the memory accesses were a page hit;
  storing, by the memory controller, a value, based at least in part on a calculated latency that is calculated based on two or more page hits to the given bank, indicative of a maximum amount of time the given bank will be held open before closing the given bank while the given bank is idle; and
  closing, by the memory controller, the given bank responsive to determining the given bank has been idle for the maximum amount of time.

11. The method as recited in claim 10, further comprising comparing a threshold to a determined page hit rate comprising a number of page hits for the given bank during a most recent N memory accesses of the given bank.

12. The method as recited in claim 10, further comprising:
  shifting a bit indicating a page hit into a given bit vector corresponding to a given bank of the memory device, responsive to a page hit on the given bank; and
  shifting a bit indicating a page miss into the given bit vector, responsive to a page miss on the given bank.

13. The method as recited in claim 12, wherein in response to receiving a given memory access request, the method further comprises:
  identifying, by the memory controller, the given bit vector corresponding to the given bank; and
  determining, by the memory controller, a ratio of bits in the given bit vector that indicate page hits to a number of bits in the given bit vector.

14. The method as recited in claim 13, further comprising:
  setting, by the memory controller, the maximum amount of time to a first amount of time, responsive to determining the ratio is above a first threshold; and
  setting, by the memory controller, the maximum amount of time to a second amount of time that is less than the first amount of time, responsive to determining the ratio is above a second threshold that is lower than the first threshold.

15. The method as recited in claim 10, wherein the calculated latency is an average latency between the two or more page hits to the given bank.

16. A memory controller comprising:
  a first interface for receiving memory access requests;
  a second interface for sending the memory access requests to a memory device;
  one or more queues configured to store the memory access requests;
  control logic;
  in response to receiving a given memory access request, the control logic is configured to:
    determine the given memory access request targets a given bank of a plurality of banks of a memory device;
    maintain an access history for memory accesses of the given bank, wherein the access history indicates how many of the memory accesses where a page hit;
    store a value, based at least in part on a calculated latency that is calculated based on two or more page hits to the given bank, indicative of a maximum amount of time the given bank will be held open before closing the given bank while the given bank is idle; and
    close the given bank responsive to determining the given bank has been idle for the maximum amount of time.

17. The memory controller as recited in claim 16, further comprising a bit vector for each bank of a memory device, wherein the control logic is further configured to:
  shift a bit indicating a page hit into a given bit vector corresponding to a given bank of the memory device, responsive to a page hit on the given bank; and
  shift a bit indicating a page miss into the given bit vector, responsive to a page miss on the given bank.

18. The memory controller as recited in claim 17, wherein in response to receiving a given memory access request, the control logic is further configured to:
  identify the given bit vector corresponding to the given bank; and
  determine a ratio of bits in the given bit vector that indicate page hits to a number of bits in the given bit vector.

19. The memory controller as recited in claim 18, wherein the control logic is further configured to:
  set the maximum amount of time to a first amount of time, responsive to determining the ratio is above a first threshold; and
  set the maximum amount of time to a second amount of time that is less than the first amount of time, responsive to determining the ratio is above a second threshold that is lower than the first threshold.

20. The memory controller as recited in claim 16, wherein the calculated latency is an average latency between the two or more page hits to the given bank.

* * * * *